March 13, 1956 — S. YRKOSKI — 2,737,869
CULTIVATOR SHIELD LIFTER
Filed Aug. 18, 1952
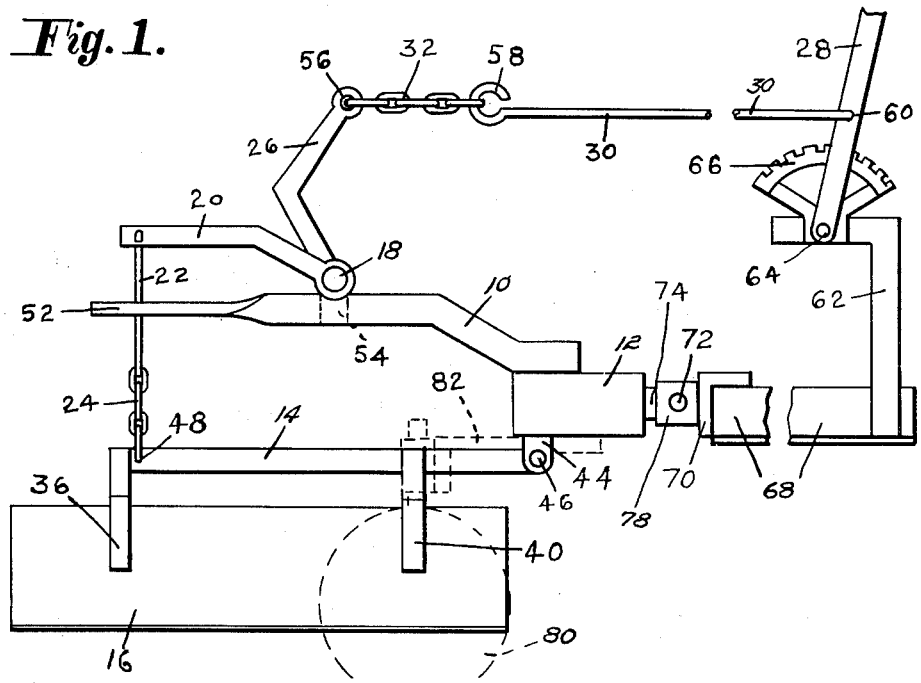
Fig. 1.
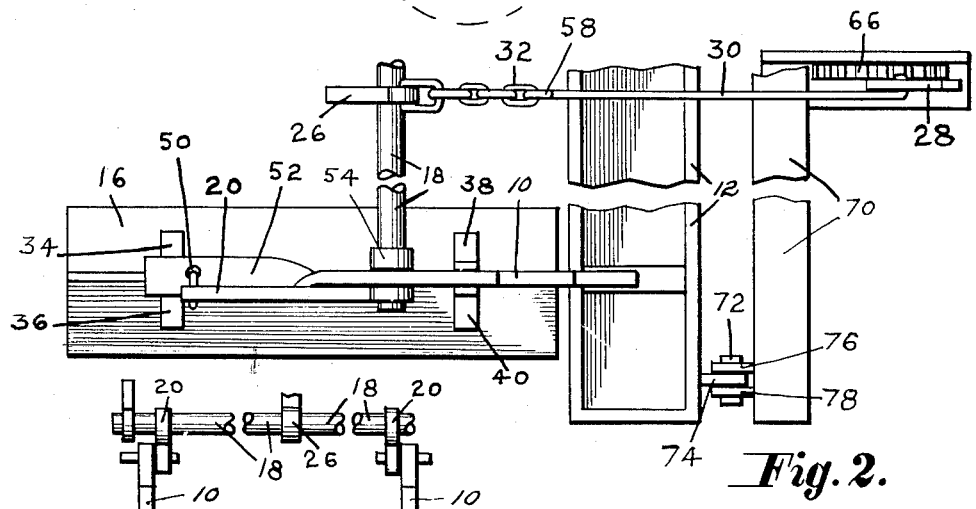
Fig. 2.
Fig. 3.
INVENTOR.
STEVE YRKOSKI
BY Arthur H. Sturges
Attorney.

—

United States Patent Office 2,737,869
Patented Mar. 13, 1956

2,737,869
CULTIVATOR SHIELD LIFTER

Steve Yrkoski, Clarks, Nebr.

Application August 18, 1952, Serial No. 305,019

6 Claims. (Cl. 97—188)

This invention relates to farm implements of the type used primarily for cultivating small plants where discs and other cultivating devices substantially bury plants and where elongated shields, preferably V-shaped in cross section, are used to cover and thereby protect the plants, and in particular this invention includes means for adjusting the elevation of the shields to compensate for variations in the size of the plants.

The purpose of this invention is to provide means whereby the operator of a tractor drawing a go-devil or similar cultivating machine may adjust the elevation of shields of the machine to correspond with plants of different sizes from the seat of the tractor and while the machine is in operation.

In numerous instances unseasonable weather makes it necessary to cultivate crops after plants have grown too tall for the usual positions of cultivator shields, and in such cases it is necessary to adjust the shields by hand. In continuing the cultivation of a field some plants are small and others large, and for this reason it is desirable to make several adjustments of the shields in cultivating a single field.

With this thought in mind this invention contemplates a shield mounting for a cultivator, such as a go-devil, wherein the shields are pivotally mounted by bars on the main frame of the cultivator and the extended ends of the bars are raised and lowered by a hand lever mounted on a towing tractor and connected to the bars with a bell-crank arrangement pivotally mounted on an arm extended from the said main frame of the cultivator.

The object of this invention is, therefore, to provide means for adjustably mounting shields of a cultivator whereby the shields are vertically adjustable from the seat of a tractor towing the cultivator.

Another object of the invention is to provide an adjustable mounting for shields of cultivators whereby the shields are vertically adjustable, and in which the mounting elements are adapted to be installed on cultivators now in use.

Another important object of the invention is to provide means for adjusting the elevation of cultivator shields in which a plurality of shields are adjustable simultaneously and with a single lever.

With the conventional type of cultivator shield mounting the elevation to which the shields may be raised is limited and for this reason it is difficult, if not impossible, to use cultivators with shields for some crops without damaging the plants.

A further object of this invention is, therefore, to provide a shield mounting for cultivators whereby shields may be adjusted to elevations higher than has been heretofore possible.

A still further object of the invention is to provide means for adjusting the elevation of shields of a cultivator from the operator's seat of a tractor towing the cultivator and while the cultivator is in operation.

And a still further object of the invention is to provide a mounting for shields of a cultivator whereby the elevation of the shields is adjustable from a tractor towing the cultivator, and in which the mounting is of a simple and economical construction.

With these and other objects and advantages in view the invention embodies arms extended rearwardly from the main frame of a cultivator, a transversely disposed shaft journaled on said arms and having levers extended upwardly and rearwardly therefrom, bars pivotally mounted on said main frame and suspended from the rearwardly extended levers, shields carried by said bars, and a hand lever pivotally mounted on a hitch connecting the cultivator to a tractor and connected to the upwardly extended lever with a rod and a chain.

Other features and advantages of the invention will appear from the following description taken in connection with the drawing, wherein:

Figure 1 is a side elevational view showing the improved shield mounting with the mounting positioned on a cultivator frame and with a disc and parts of mounting elements therefor shown in broken lines.

Figure 2 is a plan view of the adjustable shield mounting with parts broken away and showing one side of a cultivator.

Figure 3 is a front elevational view of the improved cultivator shield mounting showing the mounting installed on a main frame beam of a cultivator and also showing one side only of the cultivator and also having parts thereof broken away.

Referring now to the drawing wherein like reference characters denote corresponding parts, the adjustable cultivator shield mounting of this invention includes rearwardly extended supporting arms 10 mounted on a beam 12 of the main frame of a cultivator, bars 14 pivotally mounted on said cultivator frame beam and from which shields 16 are suspended, a transversely disposed shaft 18 journaled on the arms 10, rearwardly extended levers 20 mounted on the shaft 18 and to which the bars 14 are connected with rods 22 and chains 24, a vertically positioned crank 26 also mounted on the shaft 18, and a hand lever 28 which is connected to the crank 26 by means of a rod 30 and a chain 32.

The shields 16, which are of inverted V-shape in cross section, are attached to the bars 14 with straps 34 and 36 at the extended end and 38 and 40 at the opposite end, the straps being welded or otherwise secured to the shields and bars, and the bars are positioned between ears 42 and 44, in which they are pivotally mounted with pins 46. The chains 24 are secured in openings 48 in the extended ends of the bars, and the rods 22 which are connected to the upper ends of the chains extend through openings 50 in twisted ends 52 of the arms 10 and are connected to the extended ends of the rearwardly extended levers 20.

The shaft 18 is journaled in bearings 54 on the arms 10 and the upper end of the vertically positioned crank or lever 26 is provided with an eye 56 to which the chain 32 is connected. The opposite end of the chain is connected to an eye 58 on the end of the rod 30 and the opposite end of the rod 30 is connected to the hand lever 28 through an opening 60. The lever 28 is pivotally mounted on an L-shaped bracket 62 by a pin 64 and the lever is provided with a conventional ratchet and segment for holding the lever in adjusted positions, as indicated by the numeral 66.

The bracket 62 is mounted on one of the hitches 68 which extend from a secondary frame 70 of the cultivator and the frame 70 is pivotally connected to the main frame beam 12 with bolts 72 that extend through lugs 74 on the beam 12 and ears 76 and 78 on the frame 70.

With the parts arranged in this manner the shield mounting elements are secured to the frame members of a cultivator as illustrated in Figure 1, with discs 80 and mounting parts 82 therefor, as indicated by the broken lines, positioned at the sides of the shields, and with the cultivator stationary or in use the elevation of the shields may be adjusted by the hand lever 28.

Although only one shield is shown in the drawing it is understood that a plurality of shields may be used on the cultivator and with the adjustable mounting elements as disclosed and described the shields will be raised and lowered simultaneously.

In operation and at times when the cultivator disc is being drawn along the ground for cultivating crops and the like the shields are so positioned as to cover and protect the crops from being buried by earth moved by the cultivator discs, and when desired the frame member 12 may be tipped upwardly by the lever 28, which may be operated from the seat of a towing tractor, whereby the shields 16 will be elevated above the crops. By this means the shields may be elevated sufficiently to permit crops to pass below the shields. For some uses it may also be desired to use the cultivator with the shields in inclined positions.

The positions of the shields are, therefore, adjustable in relation to the crops and ground, and the positions of the shields are adjusted from the operator's seat of the towing tractor.

From the foregoing description it is thought to be obvious that an adjustable shield mounting constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. A cultivator shield mounting comprising an elongated shield, a transversely disposed beam positioned above and in advance of said shield, a bar pivotally mounted on the beam and extended rearwardly therefrom, means suspending the shield from the bar, a supporting arm carried by the beam and suspended over the shield, a shaft journaled on said arm, a lever carried by said shaft, means connecting the bar to the lever, a hand lever having a holding ratchet thereon, and means actuating the shaft by the hand lever for adjusting the elevation of the shield.

2. A cultivator shield mounting comprising an elongated shield, a transversely disposed cultivator beam positioned above and in advance of said shield, a bar pivotally mounted on the beam and extended rearwardly therefrom, means suspending the shield from the bar, a supporting arm carried by the beam and extended over the shield, a transversely disposed shaft journaled on said arm, a lever mounted on said shaft and extended over the shield, means connecting the extended end of the lever to the bar, a hand lever having a holding ratchet thereon and positioned to be actuated from the seat of a tractor towing the cultivator, and means actuating the shaft by said hand lever for adjusting the elevation of said shield.

3. A cultivator shield mounting comprising an elongated bar, means pivotally connecting one end of said bar to a frame beam of a cultivator, an elongated inverted shield, V-shaped in cross section, means suspending said shield from the bar, an arm mounted on said cultivator beam with the arm extended over the shield, a shaft journaled on said arm, a rearwardly extended lever mounted on said shaft and also extended over the shield carried by the bar, means connecting the extended end of the lever to the bar, a hand lever pivotally mounted on a holding ratchet, a vertically disposed crank extended from said shaft, and means connecting the extended end of the vertically disposed crank to the hand lever.

4. In a cultivator shield mounting, the combination which comprises a transversely positioned beam, a bar pivotally mounted on the under surface of said beam and extended rearwardly and at a right angle thereto, a cultivator shield carried by said bar, an arm mounted on said beam and extended over said bar and shield, a transversely disposed shaft journaled on said arm and also extended over the bar and shield, a rearwardly extended lever carried by said shaft and connected to the bar, a vertically positioned crank also carried by said shaft, means operatively connecting the vertically positioned crank to the rearwardly extended lever, a hand lever positioned to be actuated from a towing vehicle, and means connecting the hand lever to said vertically positioned crank.

5. In a cultivator shield mounting, the combination which comprises a transversely disposed beam, a bar pivotally mounted at one end thereof on the under surface of said beam and extended rearwardly and at a right angle thereto, a cultivator shield carried by said bar, an arm mounted on said beam and extended over the bar and shield, a shaft journaled on said arm, a rearwardly extended lever mounted on said shaft, a rod depending from said lever, a chain connecting the rod to the bar on which the shield is carried, a vertically positioned crank mounted on said shaft, a hand lever positioned to be actuated by a towing vehicle, a rod extended from said hand lever, and a chain connecting the rod extended from the hand lever to said vertically positioned crank.

6. In a cultivator attachment, the combination which comprises an elongated inverted shield, V-shaped in cross section, a horizontally disposed bar parallel to and spaced above the shield, means connecting the shield to the bar, means pivotally attaching one end of the bar to a cultivator, supporting arms mounted on said cultivator and extending rearwardly from the cultivator above said bar, said arms having openings in the extended ends thereof, a transversely disposed shaft journaled on said arms, a lever mounted on the shaft and extended rearwardly therefrom, said lever positioned above the arm, bar and shield, a rod connected to the lever and extended through the opening in the arm over which the lever is positioned, links connecting the rod to the bar, a crank extended upwardly from the shaft, a hand lever, a bracket for pivotally mounting the hand lever on a tractor, a ratchet mounted on the bracket and positioned to coact with the hand lever for retaining the hand lever in adjusted positions on the bracket, a rod extended from said hand lever, and a chain connecting the rod to the crank whereby the elevation of the shield in relation to a cultivator upon which the attachment is mounted is adapted to be adjusted by the hand lever.

References Cited in the file of this patent

UNITED STATES PATENTS

| | | |
|---|---|---|
| 1,498,457 | Kruszynski | June 17, 1924 |
| 1,563,291 | Rasmussen | Nov. 24, 1925 |
| 2,195,338 | Neumann et al. | Mar. 26, 1940 |
| 2,220,338 | Koebel | Nov. 5, 1940 |
| 2,465,043 | Schumacher et al. | Mar. 22, 1949 |